United States Patent [19]

Palilla et al.

[11] Patent Number: 4,487,732
[45] Date of Patent: Dec. 11, 1984

[54] METHOD OF FABRICATING ARC LIMITING REFRACTORY RESISTIVE ELEMENT

[75] Inventors: Frank C. Palilla, Framingham, Mass.; Burton W. MacAllister, Jr., Hudson, N.H.; John F. McKenna, Newburyport, Mass.

[73] Assignee: GTE Laboratories Incorporated, Waltham, Mass.

[21] Appl. No.: 513,891

[22] Filed: Jul. 15, 1983

Related U.S. Application Data

[62] Division of Ser. No. 303,316, Sep. 17, 1981, Pat. No. 4,418,327.

[51] Int. Cl.³ .............................................. C04B 35/64
[52] U.S. Cl. ........................................ 264/61; 264/82
[58] Field of Search ............................ 264/56, 61, 82

[56] References Cited

U.S. PATENT DOCUMENTS

| | | | |
|---|---|---|---|
| 3,244,559 | 4/1966 | Sivertsen et al. | 338/309 |
| 3,295,008 | 12/1966 | Gallavo et al. | 315/3 |
| 3,405,011 | 10/1968 | Caprioglio | 136/120 |
| 4,101,803 | 7/1978 | Retsky et al. | 315/3 |
| 4,110,260 | 8/1978 | Yamamoto et al. | 252/219 |
| 4,151,235 | 4/1979 | May et al. | 264/61 |

FOREIGN PATENT DOCUMENTS 55-86055  6/1980  Japan .
57-52101  3/1982  Japan .

OTHER PUBLICATIONS

Kobori et al, "A Novel Arc-Suppression Technique for Cathode-Ray Tubes", IEEE Transactions on Consumer Electronics, vol. CE-26, Aug. 1980, pp. 446-451.

Primary Examiner—James Derrington
Attorney, Agent, or Firm—Ivan L. Ericson

[57] ABSTRACT

An arc limiting refractory resistive element is fabricated from aluminum oxide, carbon black and a sintering aid. The fabricating process includes compacting a mixture of the materials, sintering the compact in an inert atmosphere, then oxidizing the outer region of the sintered compact to form a non-conductive sheath around the electrically conductive material.

12 Claims, 1 Drawing Figure

U.S. Patent  Dec. 11, 1984  4,487,732
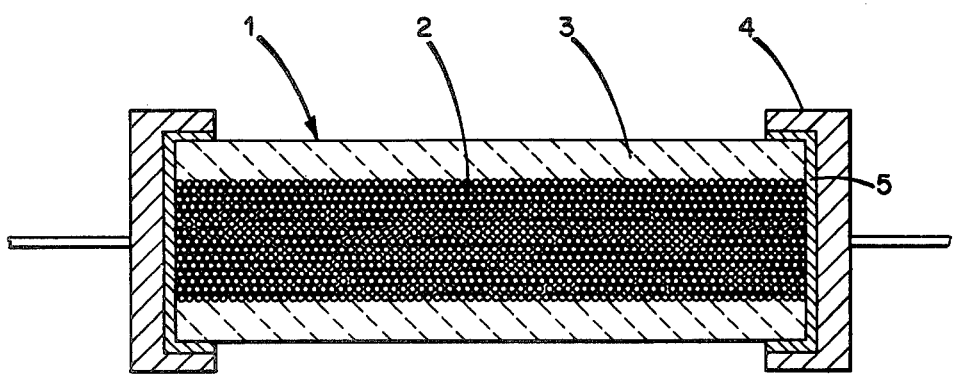

METHOD OF FABRICATING ARC LIMITING REFRACTORY RESISTIVE ELEMENT

This is a division of application Ser. No. 303,316, filed Sept. 17, 1981, now U.S. Pat. No. 4,418,327.

FIELD OF THE INVENTION

This invention relates to a refractory resistive element and the method of fabricating. More particularly, it is concerned with refractory resistive elements used for the suppression of excessively high currents when arcing occurs in certain electrical circuits.

BACKGROUND OF THE INVENTION

The use of resistive coatings for arc suppression in cathode ray tubes is well known. It has been conventional practice in cathode ray tube construction to apply an electrically conductive coating on the interior surface of the funnel member of the tube envelope in a manner to extend from substantially the vicinity of the cathodoluminescent screen into the forward region of the adjoining neck member. This coating, which usually has a high positive electrical potential applied thereto via connective means traversing the wall of the funnel member, serves as a connective medium conveying a high electrical potential of substantially a common value to both the screen and the terminal electrode of the electron gun assembly oriented within the neck member of the tube envelope. Thus, the condition is present for the possible generation of a spark discharge between the terminal electrode and the adjacent lower voltage electrode in the gun assembly, especially in the presence of aggravating elements such as sublimation deposits, foreign particles, and minute projections extending into the inter-electrode spacings.

Arcing or dielectric breakdown within the cathode ray tube has always been an undesired possibility. The magnitude of the arcing has been found to sometimes exhibit destructive intensities of 100 amperes or more. With the increased employment of solid state components in television and allied display devices, arcing within the cathode ray tube can produce catastrophic effects on the vulnerable components in the externally associated operating circuitry. Additionally, an arc discharge initiated within the tube may seriously damage the internal structure thereof and resultantly promote leakage through the sublimation of deleterious metallic desposits on related surfaces in the region of the gun structure.

Cleanliness, precision, vigilance and care in the tube manufacturing process are ever continuing procedures employed to combat the materializing of conditions conducive for arcing. Nevertheless, human factors, processing sublimates, manufacturing tolerances and procedural variations may combine to produce an undesirable and aggravative situation.

Another technique for suppressing arcs in cathode ray tubes was suggested by Kabori et al. at an IEEE Conference on Consumer Electronics in Chicago on June 19, 1980. Kabori et al. used resistors made from $Al_2O_3$ and clay with the addition of several weight percent of carbon for suppressing arcs in cathode ray tubes. The $Al_2O_3$, clay and carbon is mixed, formed into a cylinder and then fired at approximately 1300° C. in a reducing atmosphere to sinter and densify. The cylinder is then placed in an oxidizing atmosphere at a higher temperature. By controlling the firing time, the outside portion of the cylinder is oxidized and a ceramic sheath is formed.

In a Japanese patent application Public Disclosure No. 86055/1980 of Kabori et al., two kinds of resistances were described. One is a fixed body resistance using metal oxide, silicon or carbon as an electric conduction material to mix and form with the necessary material to create a ceramic, and then sintered at high temperature. Another is a thin film resistance using carbon, iron oxide, or silicon carbide (SiC) which is deposited inside the conduction film. It is made into the shape of a lead wire as a thin film resistance.

SUMMARY OF THE INVENTION

In accordance with one aspect of the present invention, a new and improved arc limiting refractory resistive element is provided comprising a body of polycrystalline aluminum oxide having an electrically conductive inner region and an electrically non-conductive outer region. The inner region consists essentially of polycrystalline aluminum oxide, from about 0.3 weight percent to about 1.0 weight percent of an electrically conductive refractory material distributed relatively uniformly throughout the polycrystalline aluminum oxide in the inner region, and a sintering aid. The outer region consists essentially of polycrystalline aluminum oxide and the sintering aid. The body has less than about 0.2 weight percent of the sintering aid.

According to another aspect of the present invention, there is provided a process for fabricating an arc limiting refractory resistive element comprising densifying a mixture consisting essentially of polycrystalline aluminum oxide, from about 0.3 weight percent to about 1.0 weight percent of an electrically conductive refractory material and less than about 0.2 weight percent sintering aid to a theoretical density from about 88 percent to about 93 percent to form a densified body. The densified body is oxidized to remove electrically conductive refractory material from the outer region of the densified body to form an electrically non-conductive outer region.

BRIEF DESCRIPTION OF THE DRAWING

The single FIGURE of the drawing is a cross-sectional view of an arc limiting refractory resistive element in accordance with the present invention.

For a better understanding of the present invention, together with other and further objects, advantages and capabilities thereof, reference is made to the following disclosure and appended claims in connection with the above-described drawing.

DETAILED DESCRIPTION OF THE INVENTION

Shown in the drawing is an arc limiting resistive element 1 in accordance with the present invention. The element is formed from aluminum oxide, carbon black and a sintering aid such as magnesium oxide. The inner region 2 of the element 1 contains an electrically conductive refractory material, such as carbon black, distributed relatively uniformly throughout polycrystalline aluminum oxide in the inner region 2 containing the same sintering aid, magnesium oxide. The outer region 3 of the element 1 contains an electrically non-conductive polycrystalline aluminum oxide containing the same sintering aid, magnesium oxide. The end regions of the resistive element have an aluminum coating 5. The aluminum coating 5 makes contact with the electrically conductive inner region 2, and an electrical contact 4 is connected to the aluminum coating 5.

In the fabricating of the arc limiting refractory resistive element, an alumina powder is initially mixed relatively uniformly with from about 0.3 to about 1.0 percent carbon in the form of graphite or carbon black. A preferred level of carbon is from about 0.7 to about 0.8 percent. De-ionized water is then added in an amount equal in weight to that of alumina. Magnesium oxide in the range of about 0.025 to about 0.10 weight percent but less than about 0.2 weight percent could be added at this point as an aid to sintering, or in the form of magnesium nitrate. Media is then added in the form of one-half inch corundum cylinders in an amount equal in volume to one-half that of the water. The resultant slurry is then ball milled for about 3 to about 18 hours. The slurry is transferred to a convenient vessel for evaporation, the media removed, and the charge dried at about 100° C. to about 110° C. (if extrusion is to be used, the $H_2O$ is removed only to the extent of obtaining a putty-like consistency). Disks are then uniaxially pressed at about 12.5 to about 50 Kpsi, using one-half inch die and about one gram of powder mix to form a monolithic body. The initial sintering is then conducted in a carbon furnace with the specimens in a carbon boat containing magnesium oxide and aluminum oxide powder under a positive pressure of argon. Densification is carried out at temperatures from about 1450° C. to about 1675° C., and preferably at about 1540° C. Densification has to proceed sufficiently to protect the integrity of the inner conductive composite in the subsequent thermal treatment in air. However, it cannot be brought so high that the carbon from the outer surface cannot be oxidatively removed in the subsequent air thermal treatment. It is necessary to keep this initial densification between about 88 percent and about 93 percent of theoretical density with a carbon content sufficient to give the resistance required of the device to function properly; i.e., about 2000 to about 20,000 ohms as a cylindrical rod, which corresponds to a resistivity (a property of the composition) in the range from about 11 to about 110 ohm-cm, which in turn corresponds to a resistance of about 3.6 to about 35 ohms in sintered disks. The carbon content can be controlled by the amount of carbon formulated and by the extend of carbon removed by the oxidation step. The specimens or densified bodies are then transferred to an air furnace and brought to a temperature of about 1350° C. to about 1550° C. for less than about 15 minutes to remove the carbon from the outer surface.

It was found that a sintered density of less than about 88 percent of the theoretical density results in complete oxidation of the carbon throughout the bulk, whereas a density of greater than about 93 percent yields virtually closed porosity, which would prevent the oxidative removal of carbon from the outer surface, which is necessary in order to provide an insulating outer region or non-conductive sheath.

Variations are possible within the above procedure. As examples, spray drying of the composite slurry or V-blending the dry powdered ingredients could be used conveniently when only uniform mixing is required. When reduction of aggregate size is also desired, ball milling may be preferable.

One specific example of how an extruded sample was prepared is: 2977.5 grams of high purity aluminum oxide (Reynolds, RC-HP-DBM) containing 0.05 percent magnesium oxide and 22.5 grams of carbon black (Cabot, CSX-179B) was blended in a V-blender for one hour with 498 grams of a PVA binder (2980 grams of 12.5 percent of Monsanto's Gelvatol polyvinyl alcohol in water plus 28 grams of Diamond Shamrock's PWA emulsifier plus 5 drops of 2-octanol and 1115 grams of kerosene) and 200 milliliters of de-ionized water added. The mixture was loaded into an hydraulic piston-type extruder. The extruder chamber was de-gased at a pressure between 10 to 30 tons (nominally 20 tons) using a 0.11 inch die. The extruded rods were dried overnight at room temperature.

The rods were then sheared to a proper length to fit into a carbon boat. A granulated powder charge material (6 percent MgO, 94 percent $Al_2O_3$) was included with the rod samples. The boat was covered with a carbon plate and placed into a carbon furnace. The furnace was sealed, evacuated and back-filled with ultra high purity argon, evacuated and back-filled a second time, and finally evacuated a third time. While under vacuum, the power was turned on and the furnace was heated. After 20 minutes, an argon flow was initiated. After 20 minutes the furnace was back-filled and pressurized to about 30 pounds. The heating cycle was started again, allowing a slow flow of gas in order to avoid additional pressure build-up. When the furnace reached 1200° C. (after 40 minutes), the argon flow was shut off and the temperature was allowed to reach 1600° C. The power was then reduced and after a brief excursion to 1658° C. (2 minutes), the temperature eventually (45 minutes) returned to 1605° C. for the remainder of the cycle. Total elapsed time at temperature was two hours.

After cooling, the rods were removed from the carbon boat and placed into an alumina tray. This tray was put into an air furnace and heated to 1500° C. (in about 2 hours from room temperature), held for 10 minutes, then furnace cooled.

The oxidized rods were removed and were cut to desired length. The rod ends were then coated with aluminum by a plasma or flame spray technique. The samples measured 1 inch × 0.09 inch diameter. The average measured resistance of the samples was 2700 ohms. The standard deviation was ±300 ohms for the 18 samples measured.

Another example is: 3180.8 grams of high purity aluminum oxide (Reynolds, RC-HP-DBM) containing 0.05 percent magnesium oxide, 19.2 grams of carbon black (Cabot, CSX-179B) and 30.2 grams of emulsifier (Diamond Shamrock's PWA) were thoroughly mixed; 18 drops of ammonium hydroxide were added and the mixture was ball milled; 498 grams of acrylic binder (30 grams Hercules Inc. Reten binder plus 87.5 grams ammonium stearate solution, 33 percent in water, plus 680.3 grams water) was added to 3000 grams of the ball milled mixture and then V-blended. The blended mixture was loaded into an hydraulic piston-type extruder. The extruder chamber was de-gased to a vacuum of 29 inches of water, then the mixture was extruded at a pressure between 10 to 30 tons (nominally 20 tons). The extruded rods were dried overnight at room temperature.

The rods were then sheared to a proper length to fit into a carbon boat. A granulated powder charge material (6 percent MgO, 94 percent $Al_2O_3$) was included with the rod samples. The boat was covered with a carbon furnace. The furnace was sealed, evacuated and back-filled with ultra high purity argon, evacuated and back-filled a second time, and finally evacuated a third time. While under vacuum, the power was turned on and the furnace was heated. After 20 minutes, and argon flow was initiated. After 20 minutes the furnace was back-filled and pressurized to about 30 pounds. The heating cycle was started again, allowing a slow flow of gas in order to avoid additional pressure build-up. When the furnace reached 1200° C. (after 40 minutes), the argon flow was shut off and the temperature was allowed to reach 1600° C. The power was then reduced and after a brief excursion to 1633° C. (2 minutes), the temperature eventually (45 minutes) returned to 1605° C. for the remainder of the cycle. Total elapsed time at temperature was two hours.

After cooling, the rods were removed from the carbon boat and placed into an alumina tray. This tray was put into an air furnace and heated to 1500° C. (in about 2 hours from room temperature), held for 10 minutes, then furnace cooled.

The oxidized rods were removed and cut to desired length. The rod ends were then coated with aluminum by a plasma or flame spray technique.

In order to obtain reliable, reproducible arc limiting refractory resistive elements, it is desirable to use high purity materials in the fabrication process as well as closely controlling the process parameters.

There are various aluminas that could be used, but polycrystalline alpha aluminum oxide, with a surface area greater than about 4 m$^2$/g, is preferred. The considerations for selection include ease of sinterability in the preferred atmosphere, non-susceptibility to form defects, especially those which can adversely effect the final electrical properties. The susceptibility to defects is based on the degree of darkened body color developed after the intial sintering.

The use of magnesium oxide as a sintering aid is preferred. It is found that its presence increases the reaction rate of sintering so that higher sintered densities are obtained for a given temperature.

For the carbon, a high surface area greater than about 500 m$^2$/g and a small particle size carbon black is preferred. The higher surface areas minimize the negative effect on alumina sinterability, and the small particle sizes minimize the residual porosity that could be expected during the second air oxidation step of converting C to $CO_2$.

It is thought that the carbon used in the mixtures serves not only as the electrically conductive vehicle, but also serves as a lubricant for the extrusion.

For the initial densification, the choice of atmosphere is related to the occurrence of side reactions and/or the loss of carbon from the specimens. In dynamic $H_2$ atmoshperes, the carbon is lost from the specimen via reaction of $C+2H_2 \rightarrow CH_4$ and the subsequent thermal decomposition of $CH_4$ back to elemental C and $H_2$ in a different part of the furnace. Under vacuum the carbon is lost because there is still a sufficient partial pressure of oxygen in a dynamically evacuated furnace using a mechanical pump to evolve the carbon via $C+O_2 \rightarrow CO_2$. The preferred atmosphere is that of a carbon furnace containing magnesium oxide and aluminum oxide powders operated under a positive pressure of an inert gas, such as argon and nitrogen or mixtures thereof. Argon was found to be the preferred gas. The densification cycle also includes a purge of the adsorbed moisture at temperatures less than about 100° C. in order to avoid the reaction of $H_2O$ with carbon to form CO, $CO_2$, $H_2$, and $CH_4$. Purging is also required at about 1000° C. to about 1200° C. to remove adsorbed hydroxide, sulfur, and acidic oxide species from the carbon surface and to prevent bloating of the composite. It was also necessary to change the sintering atmosphere from $N_2$ to Ar in order to avoid the formation of AlN at temperatures as low as about 1300° C., but nitrogen can be used at lower temperatures. This formation of AlN and lower oxides of alumina were determined to occur by way of aluminum carbide intermediates, which in turn resulted from the extremely high reactivity of the carbon with $Al_2O_3$. The need to eliminate the electrically conductive component from the outer region is accomplished by an oxidative thermal treatment. This treatment requires the inclusion of $O_2$ in order to effect the removal of the carbon from the outer surface via $C+O_2 \rightarrow CO_2$. Here there is considerable latitude and optimal time and temperatures depend primarily on the sintered density of the specimen after the first densification. In general though, firing to about 1400° C. for less than about 15 minutes or about 1500° C. for about 10 minutes is effective in brining about the removal of carbon from the outer surface and, with this removal, a further densification to close the residual porosity from the carbon evolution may occur.

Metallographic examinations reveal a clean, carbon-free, outer insulating layer and a well-defined inner region and boundary layer. The conductivity is thought to be attributable to the longitudinal alignment of the carbon particles as well as the intrinsic conductivity of the individual carbon particles.

The means for establishing a reliable electrical contact with the electrically conductive inner region is done by aluminizing the ends of the resistive material by plasma spray and thermal spray techniques.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for fabricating an arc limiting refractory resistive element comprising:

densifying a mixture consisting essentially of polycrystalline aluminum oxide, from about 0.3 weight percent to about 1.0 weight percent of an electrically conductive refractory material and less than about 0.2 weight percent sintering aid to a theoretical density from about 88 percent to about 93 percent to form a densified body; and oxidizing said densified body to remove said electrically conductive refractory material from the outer region of said densified body to form an electrically non-conductive outer region.

2. A process for fabricating an arc limiting refractory resistive element of claim 1 wherein said densified body contains from about 0.7 weight percent to about 0.8 weight percent of said electrically conductive refractory material.

3. A process for fabricating an arc limiting refractory resistive element of claim 1 wherein said electrically conductive refractory material is carbon.

4. A process for fabricating an arc limiting refractory resistive element of claim 3 wherein said carbon is selected from the group consisting of graphite, carbon black, and combinations thereof.

5. A process for fabricating an arc limiting refractory resistive element of claim 4 wherein said carbon black has a surface area greater than about 500 m$^2$/g.

6. A process for fabricating an arc limiting refractory resistive element of claim 1 wherein said sintering aid is magnesium oxide.

7. A process for fabricating an arc limiting refractory resistive element of claim 1 wherein said densified body contains from about 0.025 weight percent to about 0.10 weight percent of magnesium oxide.

8. A process for fabricating an arc limiting refractory resistive element of claim 1 wherein said sintering aid is magnesium nitrate.

9. A process for fabricating an arc limiting refractory resistive element of claim 1 wherein said densifying comprises sintering at a temperature from about 1450° C. to about 1675° C.

10. A process for fabricating an arc limiting refractory resistive element of claim 1 wherein oxidizing said densified body includes:
    heating said densified body in an oxidizing atmosphere at a sufficient temperature and period of time to remove said electrically conductive refractory material from said outer region of said densified body to form an electrically non-conductive outer region.

11. A process for fabricating an arc limiting refractory resistive element of claim 10 wherein said densified body is heated to a temperature of from about 1350° C. to about 1550° C. for a period of time less than about 15 minutes.

12. A process for fabricating an arc limiting refractory resistive element of claim 10 wherein said oxidizing atmosphere is air.

* * * * *